J. Hosford.
Harness Pad.
No. 66,086. Patented June 25, 1867.
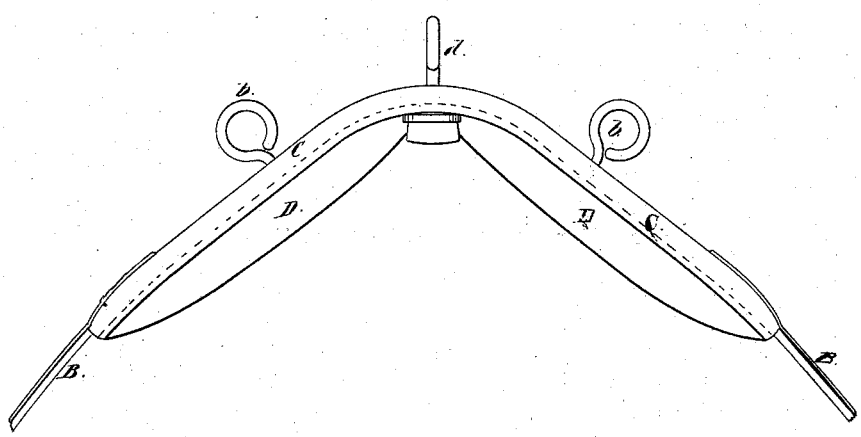
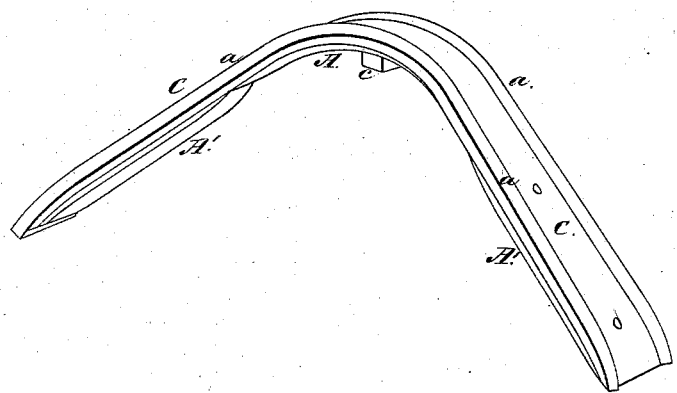
Witnesses:
W. H. Burridge
J. Holmes
Inventor:
John Hosford

United States Patent Office.

JOHN HOSFORD, OF MONROEVILLE, OHIO.

Letters Patent No. 66,086, dated June 25, 1867.

IMPROVEMENTS IN HARNESS-PADS.

*The Schedule referred to in these Letters Patent and making part of the same.*

TO ALL WHOM IT MAY CONCERN:

Be it known that I, JOHN HOSFORD, of Monroeville, in the county of Huron, and State of Ohio, have invented certain new and useful improvements in Harness-Pads; and I do hereby declare that the following is a full and complete description of the same, reference being had to the accompanying drawings, making part of this specification, in which—

Figure 1 is a side view.

Figure 2 is a perspective view of the tree detached.

Like letters of reference refer to like parts in the views.

A represents the tree, which is covered with leather, A', in which leather are secured the nuts through which the screws pass that connect the strap B to the trees. C is an upper tree, secured to the tree A by means of the nut $c$, and which can be made of any suitable metal, such as brass, sheet iron, tin, &c., and then covered with leather, as shown in fig. 1, or it can be left uncovered, as may be thought desirable, the pads D being secured to and covering the tree A and leather A'. The upper tree C is provided with flanges $a$ on either side, and is also wider at each end than in the centre, as shown in fig. 2. The strap B is placed on this tree, and the flanges $a$ prevent any lateral movement of said strap, and give more strength and durability to the harness, the terrets $b$ and check-hook $d$ being screwed into said strap and extending through into the nuts in the leather covering A', above referred to, there being also a screw near each end of the tree, which holds the strap in place.

When two trees are made and connected in this way it is not necessary to sew or connect the pads D to the strap B, as in the ordinary way, as the upper tree C will hold them in place, and in this way much time and labor are saved. When the pads wear out new ones can be replaced by simply removing the terrets $b$, and screws referred to above, by which the pads and strap are connected, when in the ordinary way the pad would have to be ripped from the strap B, and then time and labor spent in sewing another in its place. In the ordinary harness the pads are liable to rip from the strap, but in this way there is no fear, as they are not connected by sewing.

What I claim as my improvement, and desire to secure by Letters Patent, is—

The arrangement of the upper tree C and flanges $a$, in combination with the lower tree A, when combined with the usual adjuncts to form a harness-pad.

JOHN HOSFORD.

Witnesses:
J. H. BURRIDGE,
W. H. BURRIDGE.